US 7,224,088 B2

(12) United States Patent
Shoemaker et al.

(10) Patent No.: US 7,224,088 B2
(45) Date of Patent: May 29, 2007

(54) MOWER RESPONSIVE TO BACKUP SENSOR

(75) Inventors: Jim Milton Shoemaker, Horicon, WI (US); Kenneth Edward Hunt, Rock Hill, SC (US); Barry Michael Hough, Rock Hill, SC (US); Robert W. Hahn, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 177 days.

(21) Appl. No.: 10/931,057

(22) Filed: Aug. 31, 2004

(65) Prior Publication Data

US 2006/0042212 A1    Mar. 2, 2006

(51) Int. Cl.
*F16P 3/20* (2006.01)
(52) U.S. Cl. ..................................... 307/328
(58) Field of Classification Search ................. 307/328
See application file for complete search history.

(56) References Cited

U.S. PATENT DOCUMENTS

| | | | |
|---|---|---|---|
| 3,924,389 A | 12/1975 | Kita | 56/10.2 |
| 4,323,136 A | 4/1982 | Van der Lely et al. | 180/271 |
| 4,804,942 A * | 2/1989 | Gaudio | 340/514 |
| 4,887,415 A | 12/1989 | Martin | 56/10.2 |
| 5,203,440 A | 4/1993 | Peterson et al. | 192/0.094 |
| 5,204,814 A | 4/1993 | Noonan et al. | 364/424.02 |
| 5,314,038 A | 5/1994 | Peterson, Jr. | 180/214 |
| 5,476,277 A * | 12/1995 | Schueman | 280/149.2 |
| 5,994,857 A | 11/1999 | Peterson, Jr. et al. | 318/282 |
| 6,021,373 A | 2/2000 | Zuercher et al. | 701/300 |
| 6,044,632 A * | 4/2000 | Schmalz et al. | 56/10.2 R |
| 6,109,010 A * | 8/2000 | Heal et al. | 56/10.8 |
| 6,130,607 A | 10/2000 | McClanahan et al. | 340/436 |
| 6,173,233 B1 | 1/2001 | Janutka et al. | 701/301 |
| 6,255,793 B1 | 7/2001 | Peless et al. | 318/580 |
| 6,316,891 B1 | 11/2001 | Hough | 318/282 |
| 6,338,013 B1 | 1/2002 | Ruffner | 701/23 |
| 6,609,357 B1 | 8/2003 | David et al. | 56/10.2 |
| 6,758,292 B2 | 7/2004 | Shoemaker | 180/53.6 |

\* cited by examiner

*Primary Examiner*—Robert L. Deberadinis

(57) ABSTRACT

An interlock circuit on a mowing vehicle or tractor deactivates the engine if a signal from a single backup sensor is interrupted. The mowing vehicle or tractor has an engine, an electric power source to provide electric current to a magneto and an ignition, a transmission connected to the engine and having forward, neutral and reverse operations, a controllable tool drive (PTO) connected to the engine for powering an accessory, and a single backup sensor to provide a signal if no object is detected behind the vehicle. A reverse sensing switch is movable between a first position if the transmission is in forward or neutral, and a second position if the transmission is in reverse. A PTO switch is movable between an on condition for activating the PTO and an off position for deactivating the PTO.

7 Claims, 3 Drawing Sheets

MOWER RESPONSIVE TO BACKUP SENSOR

FIELD OF THE INVENTION

This invention relates generally to interlock circuits for vehicles such as lawn and garden tractors, and more specifically to interlock circuits for selectively disabling operation of the engine and/or an accessory drive such as a PTO when an obstacle is sensed behind the vehicle.

BACKGROUND OF THE INVENTION

Vehicles such as lawn and garden tractors may have PTO driven accessories, such as a lawn mower deck, that may be shut off when the vehicle is operated in reverse. For example, when a vehicle is shifted into reverse with the PTO running, an interlock circuit with a reverse gear switch may disconnect the PTO drive and/or stop the engine. The interlock circuit may prevent all operation of PTO driven accessories while the vehicle is operated in reverse.

In recent years, interlock circuits have been proposed to include sensors that permit limited operation of the PTO when the vehicle is operated in reverse, but stop PTO operation if the sensor detects an object behind the vehicle. Various types of sensors have been proposed for detecting obstacles behind the vehicle, including but not limited to ultrasonic, infrared, or photoelectric sensors.

Some interlock circuits may include two or more sensors, such as those described in U.S. Pat. Nos. 6,021,373; 6,044,632; 6,130,607; and 6,173,233. There is a need for a simple, low-cost interlock circuit for use with a single sensor to detect objects behind a vehicle.

Additionally, interlock circuits proposed for sensors that detect obstacles behind riding lawn mowers and similar vehicles may not provide any assurance that the sensor is operational. There is a need for an interlock circuit that will provide assurance that the sensor is working and/or working correctly.

Additionally, an interlock circuit for a sensor that detects obstacles behind a vehicle is needed that will allow the operator to override and continue using the implement in reverse even if an object is detected behind the vehicle.

Additionally, an interlock circuit for a sensor that detects obstacles behind a vehicle is needed that may be reset and provide a non-intrusion signal after an object clears the field of view.

SUMMARY OF THE INVENTION

An interlock circuit for a vehicle such as a lawn and garden tractor may be connected to a single sensor that detects objects behind the vehicle when the vehicle is in reverse with the PTO engaged. If no object is detected, the interlock circuit receives a non-intrusion signal from the sensor. If an object is detected by the sensor within a specified vision area, the interlock circuit shuts off the engine.

DESCRIPTION OF THE PREFERRED EMBODIMENT

Figure 1A:
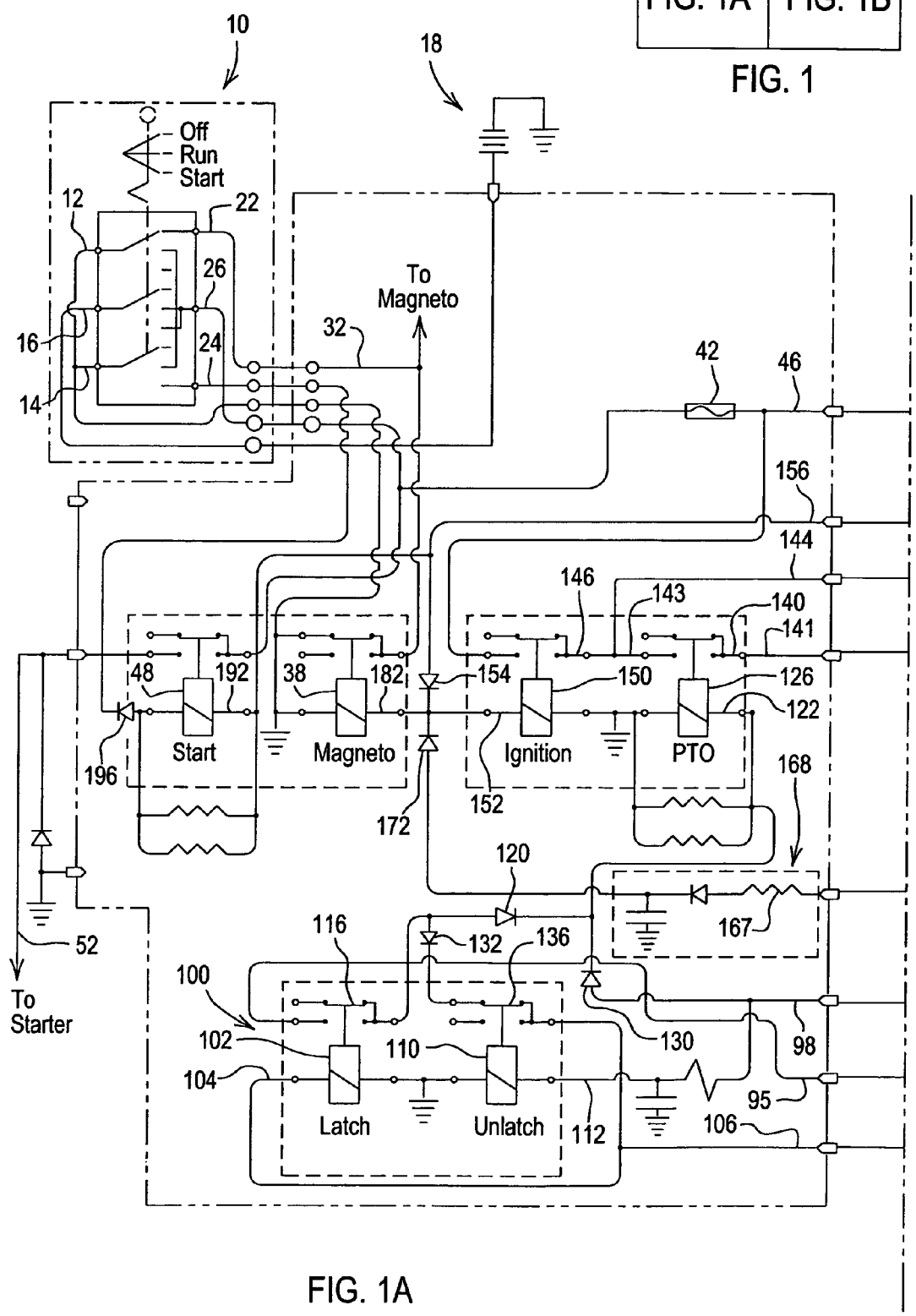
FIGS. 1a and 1b show a schematic of an interlock system for a vehicle such as a tractor or riding mower, that is responsive to a backup sensor according to a first embodiment.
Figure 1B:
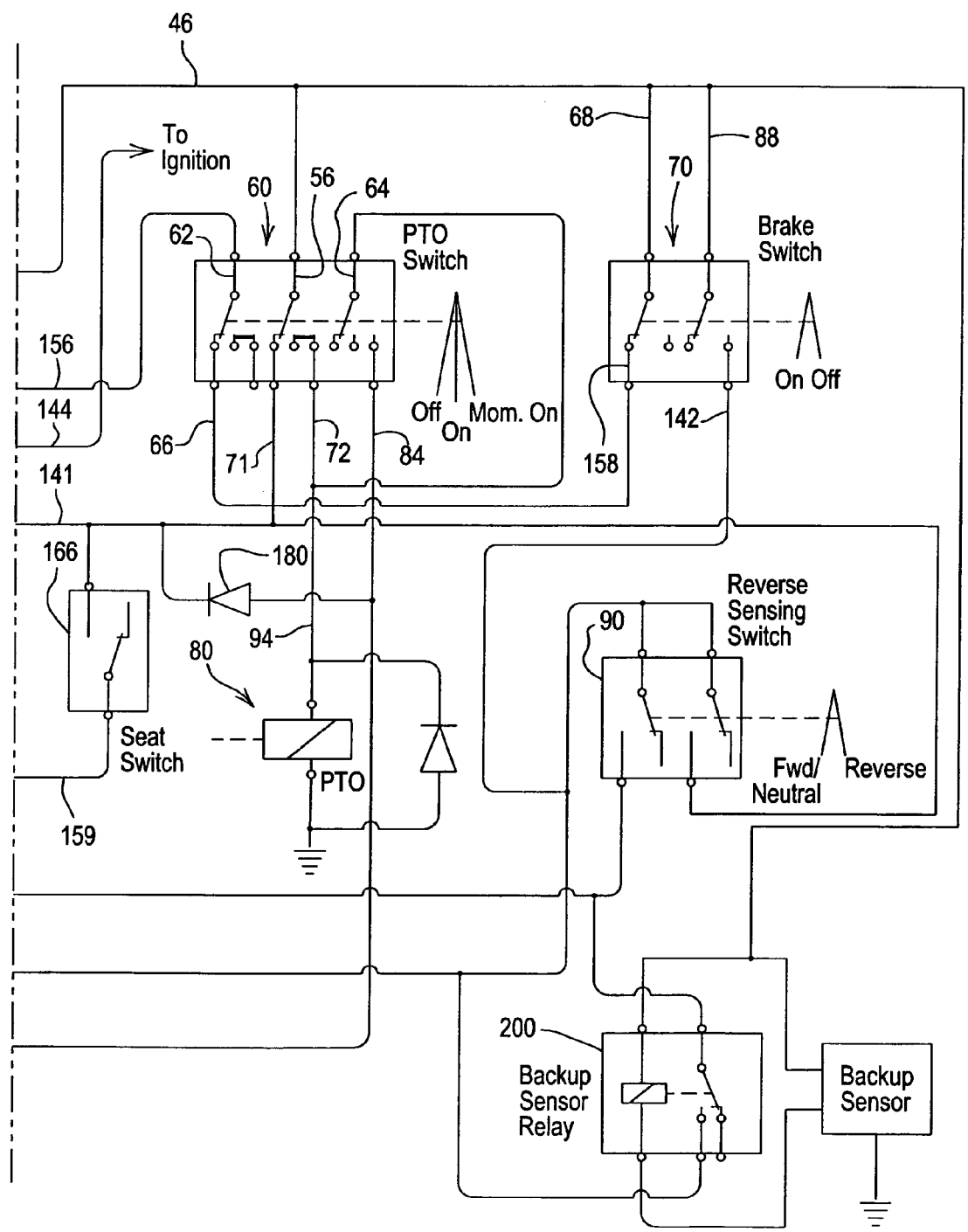

Referring to FIGS. 1a and 1b, therein is shown a circuit schematic for a vehicle such as a tractor or riding mower having an ignition switch 10 with switch input terminals 12 and 14 connected to ground, and an input terminal 16 connected to the source of electrical power 18 on the vehicle. The switch 10 includes an off (uppermost) position, a run (center) position, and a start (lowermost) position. A closed path is provided from the terminal 12 to the terminal 22 only when the switch 10 is in the off position as shown. The output terminal 26 is connected to the input terminal 16 and to the source of power 18 when the switch 10 is in the run or the start position. The terminal 24 is connected to ground through the terminal 14 only when the switch 10 is in the start position.

The terminal 22 is connected by line 32 to a magneto shut-down terminal and to the switched input terminal of a magneto relay 38 to assure engine kill when the ignition switch 10 is moved to the off position. The terminal 26 is connected through a fuse 42 to a switched power line 46 and to the switched input terminal of a start relay 48. The start relay 48 is activated and powers a line 52 to the starter when certain pre-selected conditions on the vehicle are satisfied and the switch 10 is moved to the start position.

The switched power line 46 is connected to a central input terminal 56 (FIG. 1b) of a PTO switch 60 having off, on, and momentary on positions and additional input terminals 62 and 64. The PTO switch 60 is biased to the on position when in the momentary on position. When the PTO switch 60 is in the off position and the park brake is in the on position, a first output terminal 66 is connected to an output terminal 158 of a park brake switch 70 to provide power from the switched power line 46 to line 156 to allow the engine to start and run. When the PTO switch is in the off position, output terminal 71 of the PTO switch 60 is connected to line 141.

When the PTO switch is in the on or momentary on position, output terminal 72 is connected to line 94 to provide a closed path from the switched power line 46 to the activation coil of an electric PTO clutch 80.

When the PTO switch is in the momentary on position, output terminal 84 is connected to a second output terminal 142 of the park brake switch 70 via blocking diode 180, to line 141 to PTO relay 126, and to a line 106 to relay structure 100, to latch relay structure 100 (FIG. 1a) when the vehicle is in a reverse gear. This is a manual latch system to allow mowing in reverse.

The relay structure 100 includes bypass latching relay 102 having a control input 104 connected by a line 106 to the input terminal 64 of the PTO switch 60. The relay structure 100 also includes an unlatching relay 110 having a control input 112 connected by the line 98 to the output terminal of the reverse sensing switch 90 so that when the line 94 is powered and the vehicle is out of reverse (switch 90 closed) the unlatching relay will be activated. The latching relay 102 includes a switched output 116 having a terminal connected via line 95 to the input terminal of reverse sensing switch 90. The opposite terminal of the switched output 116 is connected through a blocking diode 120 to a PTO control input 122 of a PTO relay 126. The PTO control input 122 is also connected via blocking diode 130 and the line 98 to the output terminal of reverse sensing switch 90. The PTO relay will activate only if the reverse sensing switch 90 is closed (vehicle not in reverse) with power applied to the input of the switch 90 (PTO switch 60 is on and brake switch 70 is off), or if the latch relay 102 is activated (PTO switch 60 is in the momentary on position) with the line 95 powered, or if the reverse sensing switch 90 is open (vehicle in reverse)

and the backup sensor relay 200 is closed. The output terminal of the switched output 116 is connected by a diode 132 to the upper terminal of the switched output 136 of the unlatching relay 110, so when the relay 110 is in the position shown (not activated), a closed path is provided between the switched output 116 of the latching relay 102 and the control input 104 of the relay 102 to bootstrap the relay 102 in the on position, provided the line 94 is powered and the relay 110 remains inactivated. Once the vehicle is taken out of reverse so switch 90 closes, the relay 110 activates to interrupt bootstrapping on of the relay 102.

To bootstrap the latch relay 102 to the on condition after interruption requires opening of the reverse sensing switch 90 by placing the vehicle in the reverse condition and temporarily moving the PTO switch 60 to the momentary on position while the PTO relay 126 is activated. Once activated by movement of the PTO switch 60 to the momentary on position, the latch 102 will remain activated until the unlatch relay 110 is deactivated by closing the switch 90.

The PTO relay 126 includes a switched output having one terminal 140 connected by a line 141 to the output terminal 71 of the PTO switch 60 and to the output terminal 142 of the reverse sensing switch 90. An opposite terminal 143 is connected by a line 144 to the vehicle ignition. The terminal 143 and line 144 are also connected to a switched output 146 of an ignition relay 150. The relay 150 includes a control input 152 connected by a blocking diode 154 and a line 156 to an input terminal 62 of PTO switch 60 to provide a current path from the switched power line 46 to the ignition relay control input through terminal 68 of the brake switch 70, and terminals 66, 62 of the PTO switch if the brake is on and the PTO switch is off.

A second path from the switched power line 46 to the control input 152 of the ignition relay 150 includes an operator presence or seat switch 166 connected to the line 159, a delay circuit 168 connected to the switch 166, and a blocking diode 172 connected to the delay circuit 168. The second path with switch 166 provides activation of the ignition relay 150 when the operator is at his station on the vehicle and switched power is on. The delay circuit 168 prevents nuisance interruptions of engine operation caused by seat bounce or the like.

The magneto grounding relay 38 includes a control input 182 connected to the ignition relay control input 152 to ground the magneto when the input 152 is unpowered to assure engine kill when power is interrupted to the terminal 152, for example, shortly after opening of the switch 166 when the operator leaves his station.

The start relay 48 has a control input 192 connected by the line 156 to the upper terminal 62 of the PTO switch so that the starter can only be activated if the terminal 62 is powered, that is, if the PTO switch 60 is off and the brake switch 70 is on, as shown. The switch 10, when in the start position, grounds one side of a control coil of the start relay 48 via diode 196 and terminal 24 to provide cranking power to the starter if the line 156 is powered (PTO off and brake on).

In operation, the operator assures that the PTO switch 60 is off and the brake switch 70 is on so that upon movement of the ignition switch 10 to the start position, the magneto relay 38 activates to unground the magneto and the ignition relay 150 activates to provide power to the ignition coil. The start relay 48 activates to turn the starter. Once the engine is running and the ignition switch 10 is in the run position with the operator at his station (the switch 166 is closed), the ignition and magneto relays will remain activated by the operator presence circuit when the vehicle is placed in a forward gear and the brake switch 70 is moved to the on position.

The control input of the PTO relay 126 receives an activation signal through the closed reverse sensing switch 90 (vehicle not in reverse), line 98 and diode 130. To initialize PTO operation, the operator must first make sure that the PTO switch 60 is in the off position (as shown) with brake switch 70 closing the connection between terminals 88 and 142 (brake off) so that a closed path is provided through switches 60 and 70 via terminals 56, 72 and 142, 88 from the powered line 46 to the line 94. Reengagement of the PTO relay 126 and the PTO 80 after shutdown requires that the PTO switch 60 first be moved to the off position. With the PTO relay on and the PTO switch 60 in the on position, the PTO is activated via line 141 through terminals 56, 72 and line 94. With the brake off and the switch 70 providing a closed path from the line 142 to the line 46, the PTO relay 126 will be bootstrapped to the on condition through the switch 90, the line 98 and the diode 130.

When the vehicle is placed in reverse (reverse sensing switch 90 is open), the backup sensor relay 200 provides a current path from the switched power line 46 which keeps the engine operating while in reverse if no object is detected by the sensor. Current is provided to magneto relay 38 and ignition relay 150. For example, the current path may be from line 46 through brake switch 70 (in the off state) to the PTO relay coil 126, and from line 46 to ignition relay 150 to line 146, line 143 through PTO relay 126 to line 141, through seat switch 166 to line 159, through time delay circuit 168 and diode 172 to ignition relay 150 through line 152, and magneto relay 38 through line 182.

Figure 2:
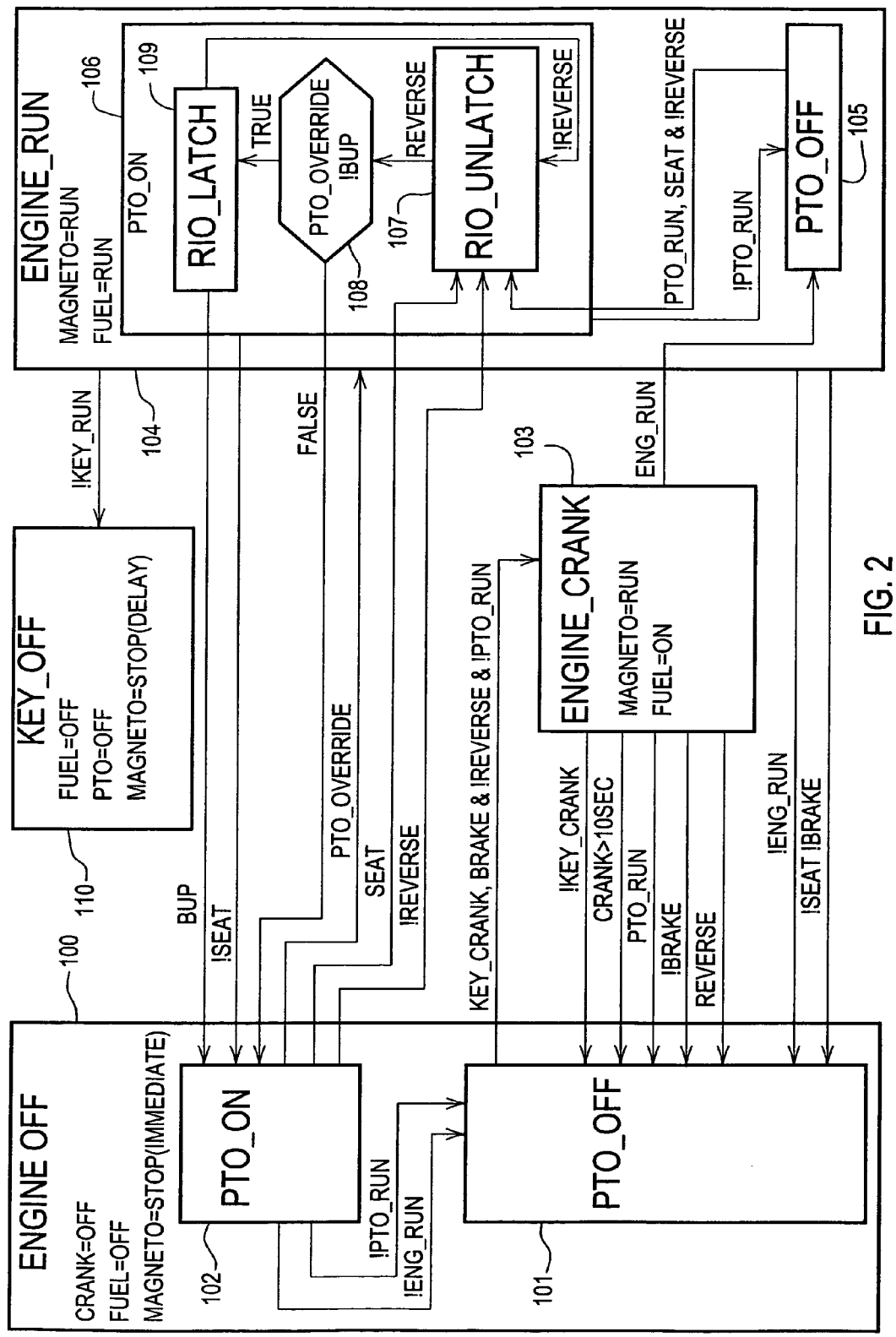
FIG. 2 is a state diagram for an interlock system according to a first embodiment.

In the state diagram shown in FIG. 2, the blocks represents states of an interlock circuit for a vehicle such as a tractor or riding mower. The symbol "!" preceding a word or phrase indicates that the condition is not true. For example, "!REVERSE" indicates that the vehicle is not in reverse.

Block 100 represents a state in which the engine is off, the magneto is stopped, and the start (crank) and fuel switches are off. In block 100, the PTO switch may be off as shown in block 101, or on as shown in block 102. If the PTO is off as shown in block 101, a key or start switch may be used to turn the magneto switch to the run position, and turn on the start (crank) and fuel switches as shown in block 103. In block 103, the brake switch is on, the reverse sensing switch indicates the vehicle is not in reverse, and the PTO switch is off. Otherwise, if the brake switch is off, or the reverse sensing switch indicates the vehicle is in reverse, or the PTO switch is on, the magneto, start and fuel switches are turned off and the interlock circuit returns to the state shown in block 101.

Block 104 represents a state of the interlock circuit in which the engine is running. The magneto is in the run position. However, if the brake is off and the seat or operator presence switch indicates no operator, the magneto, start and fuel switches are turned off and the interlock circuit returns to the state of block 101. When the engine is running in block 104, the PTO may be off as shown in block 105, or the PTO may be on as shown in block 106.

Block 106 represents a state of the interlock circuit in which the PTO switch is on. To enter block 106 and activate the PTO, the seat or operator presence switch must indicate an operator is present, and the reverse sensing switch must indicate the vehicle is not in reverse. In block 106, the reverse implement option switch may be unlatched as shown in block 107, or latched as shown in block 109. If the reverse implement option switch is latched as shown in block 109, the PTO may be on while the vehicle is in reverse.

Block 109 represents a state in which the PTO is on and the reverse implement option switch is latched. To go from block 107 to block 109, the vehicle may be shifted into reverse and a backup presence detector must provide a true signal as shown in block 108. The true signal indicates no object is detected behind the vehicle. In block 108, if the backup presence detector provides a false signal indicating an object is detected behind the vehicle, a sensor malfunction, or otherwise stops providing an appropriate signal, the magneto is stopped immediately to kill the engine as shown in block 102.

Block 110 represents a state of an interlock circuit in which the key is turned to the off position, the fuel and PTO are turned off, and the magneto is turned to the stop position. The magneto and fuel solenoid may be shut off at once, or a delay may be provided to prevent engine after bang at shut down due to unburned fuel entering the muffler. For example, a delay may allow the spark plugs to continue to fire and burn up fuel for a set period such as two seconds after the key switch is shut off and the fuel solenoid is turned off. Delay circuit 168 shown in FIG. 1A may be used to provide this capability.

If the vehicle is in reverse with the PTO on as shown in block 109, and the sensor detects something in the field of view behind the vehicle, the engine will shut down, returning to block 102. In one embodiment, an operator, while remaining seated, may cause the engine to recover before it stops spinning. For example, the engine may recover if the operator shifts out of reverse to neutral or forward before the engine stops spinning. Alternatively, the engine may recover if the operator activates a PTO override switch before the engine stops spinning, thus moving from being latched as shown in block 109 to unlatched as shown in block 107. If the operator leaves the seat with the brake off and/or the PTO running, the engine will commence to shut down. The engine may recover if the operator sits back in the seat before the engine stops spinning.

A backup presence detector may be mounted at or near the rear of the vehicle. Various different sensors may be used, including but not limited to ultrasonic, infrared, or photoelectric sensors. With the PTO on while the vehicle is in neutral or forward, the backup presence detector does not affect machine operation.

When in reverse with the PTO engaged, the backup presence detector may provide a non-intrusion signal unless an object is detected in the specified vision area of the sensor behind the vehicle. The interlock circuit includes logic or machine control that looks for a non-intrusion signal from the backup presence detector. If no intrusion is detected in the specified vision area, the backup presence detector provides a non-intrusion signal to the interlock system so that the vehicle engine will continue to run. If, while the vehicle is in reverse and the PTO is engaged, the backup presence detector detects an object in its specified vision area, the sensor will provide a signal which will cause the vehicle engine to shut down.

In one embodiment, the operator of the vehicle may shift the vehicle transmission from reverse to neutral or forward before the engine stops, so that the interlock control system may recover the engine to a running state. When shifted to neutral or forward, reverse sensing switch 90 will bypass the backup sensor relay 200 and return power to line 98 through diode 130 to PTO relay 126, and to line 141 through seat switch 166, line 159 to delay network 168, and to ignition relay 150 which restores power to lines 146 and 143.

In one embodiment, the vehicle operator may manually activate the reverse implement option (RIO) and bypass the back up sensor, thus returning the engine to a running state. The RIO may be activated by moving PTO switch 60 to the momentary on position, connecting line 46 to line 84, providing power to the latch network 100, through diode 120 to PTO relay 126, and also through diode 180 to line 141, through seat switch 166 to line 159, through delay 168 and diode 172 to ignition relay 150.

Having described the preferred embodiment, it will become apparent that various modifications can be made without departing from the scope of the invention as defined in the accompanying claims.

The invention claimed is:

1. An interlock circuit on a mowing vehicle having an engine, an electric power source to provide electric current to a magneto and an ignition, a transmission connected to the engine and having forward, neutral and reverse operations, a controllable tool drive (PTO) connected to the engine for powering an accessory, and a single backup sensor to provide a signal if no object is detected behind the vehicle, the interlock circuit comprising:

a reverse sensing switch movable between a first position if the transmission is in forward or neutral, and a second position if the transmission is in reverse;

a PTO switch connected to the PTO, the PTO switch movable between an on condition for activating the PTO and an off position for deactivating the PTO;

the interlock circuit grounding the magneto and the ignition if a signal from the single backup sensor is interrupted while the reverse sensing switch in the second position and the PTO switch is in the on condition.

2. The interlock circuit of claim 1 wherein the electric current from the electric power source to the magneto and to the ignition may be switched on by shifting the transmission to forward or neutral after the signal from the single backup sensor is interrupted.

3. The interlock circuit of claim 1 wherein the PTO switch has a momentary on position to switch on electric current from the electric power source to the magneto and to the ignition after the signal from the single backup sensor is interrupted.

4. The interlock circuit of claim 1 further comprising a delay circuit to delay the time to switch off electric current to the magneto.

5. In a lawn and garden vehicle having an operator station, a ground drive for providing vehicle drive and non-drive conditions including a selector for selecting either forward or reverse vehicle operation, a controllable tool drive (PTO) for powering an accessory, and an interlock circuit, the interlock circuit comprising:

a PTO switch connected to the PTO, the PTO switch movable to an on condition for activating the PTO, and to an off condition for deactivating the PTO;

a reverse sensing switch connected to the PTO and the PTO switch and responsive to the selection of reverse vehicle operation; and a backup sensor switch connected to the PTO switch and reverse sensing switch for providing a non-intrusion signal if no object is detected behind the vehicle, and halting operation of the ground drive if an object is detected behind the vehicle while the PTO is activated during reverse vehicle operation.

6. The interlock circuit of claim 5 further comprising an operator presence switch to halt operation of the ground drive if an operator is not detected on the vehicle.

7. The interlock circuit of claim 5 wherein the PTO switch further comprises a position to bypass the backup sensor switch.

* * * * *